United States Patent
Eberhard

(10) Patent No.: US 8,068,873 B1
(45) Date of Patent: Nov. 29, 2011

(54) CELLULAR TELEPHONE WITHOUT INTEGRATED SPEAKER AND MICROPHONE

(75) Inventor: Timothy L. Eberhard, Mission, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 494 days.

(21) Appl. No.: 12/364,928

(22) Filed: Feb. 3, 2009

(51) Int. Cl.
*H04B 1/38* (2006.01)
(52) U.S. Cl. ..................................... 455/557
(58) Field of Classification Search .......... 455/557
See application file for complete search history.

(56) References Cited

U.S. PATENT DOCUMENTS 7,009,599 B2   3/2006   Pihlaja

*Primary Examiner* — Lincoln Donovan
*Assistant Examiner* — Daniel Rojas

(57) ABSTRACT

Disclosed herein is a cellular telephone that does not include an integrated microphone and an integrated speaker but that instead requires use of an externally connected microphone and speaker to facilitate voice communication. By omitting any integrated microphone and integrated speaker, the cellular telephone may have increased surface area usable for other purposes, such as a display or keypad. Further, the cost to manufacture the cellular telephone could be incrementally lower than the cost to manufacture a comparable cellular telephone having an integrated microphone and integrated speaker.

20 Claims, 4 Drawing Sheets

CELLULAR TELEPHONE WITHOUT INTEGRATED SPEAKER AND MICROPHONE

BACKGROUND

In order to facilitate voice communication, a cellular telephone generally includes an integrated microphone and an integrated speaker, each optimally positioned at an exterior surface of the cellular telephone so that a user can hold the cellular telephone with the speaker near the user's ear and the microphone within range of the user's mouth. Audio processing circuitry in the cellular telephone delivers to the speaker outbound audio signals representative of audible communications, for presentation of the audible communications to the user. Likewise, the audio processing circuitry receives from the microphone and processes audio signals representative of audible communications received by the microphone.

For the user's convenience or safety, a typical cellular telephone also includes a mechanism to connect with an external microphone/speaker combination through a wireless or wired link. For instance, the cellular telephone may include a short-range wireless interface, such as a BLUETOOTH or WI-FI interface (or other frequency hopping spread spectrum connection mechanism) or an infrared interface, that is arranged to pair with a correspondingly equipped headset having both microphone and speaker components, or the cellular telephone may include a jack for receiving a plug that provides a corded connection with a headset having both microphone and speaker components.

When an external headset is paired or otherwise connected with the cellular telephone, the audio processing circuitry in the cellular telephone causes audible communications to be routed between the cellular telephone and the external headset rather than between the cellular telephone and the integrated microphone and speaker. A user of the cellular telephone may thus conveniently engage in a voice call without the need to hold the cellular telephone with the integrated speaker near the user's ear or the integrated microphone near the user's mouth.

OVERVIEW

Although integrated microphones and speakers in cellular telephones have become quite small and unobtrusive, positioning such components at the surface of the cellular telephone can unfortunately consume valuable surface area that could otherwise be used for a different purpose.

For instance, an increasing number of cellular telephones today are equipped with touch-screen displays, which should optimally be as large as possible. In some cellular telephones, however, the surface-positioned microphone and speaker are provided on the same front surface as the touch screen display, above and below the such as with the speaker positioned above the display and the microphone positioned below the display as shown in FIG. 1 for instance. Providing the microphone and speaker in this manner might preclude a larger touch screen display.

Further, other cellular telephones provide a display and keypad, and maximizing the size of both the display and keypad would be preferable. In such cellular telephones, however, again, the surface-positioned microphone and speaker are typically provided on the same front surface as the display and keypad as shown in FIG. 2, similarly reducing the area available for the display and keypad.

Further, providing an integrated microphone and integrated speaker in a cellular telephone necessarily increases the cost of manufacturing the cellular telephone, even if by a small increment.

Given the convenience of using an external headset, it would be advantageous to provide a cellular telephone that does not include an integrated microphone and integrated speaker but that instead requires use of an externally connected microphone and speaker to facilitate voice communication. Such a cellular telephone could thereby have increased surface area for other purposes, such as a display or keypad, or could be made smaller overall given that it would be unnecessary to hold the cellular telephone near the ear and in range of the user's mouth. Further, the cost to manufacture such a cellular telephone could be incrementally lower than the cost to manufacture a comparable cellular telephone having an integrated microphone and integrated speaker.

These and other aspects will become apparent to those of ordinary skill in the art by reading the following detailed description, with reference where appropriate to the accompanying drawings. Further, it should be understood that the description provided herein, including in this overview section, is provided by way of example only and is not intended to be limiting.

DETAILED DESCRIPTION

Figure 1:
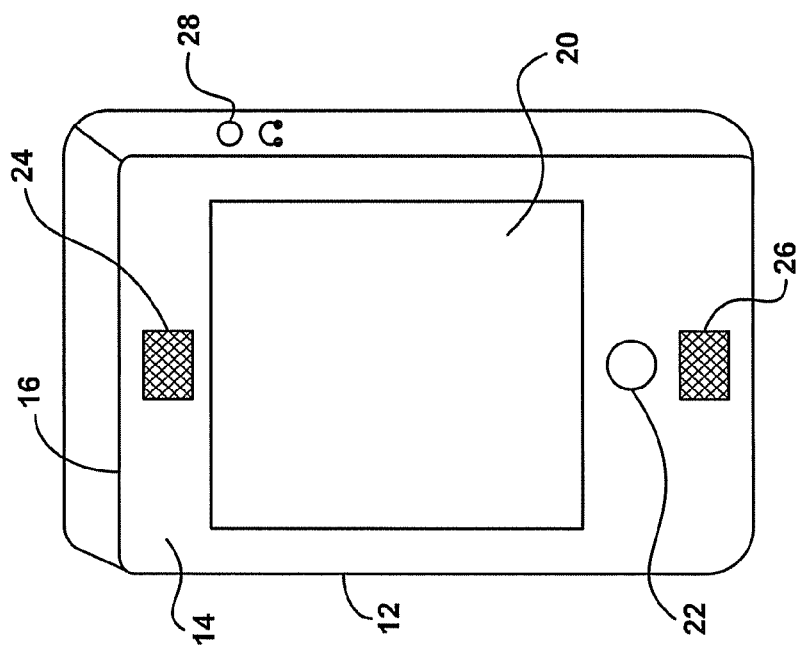
FIG. 1 is a perspective view of a prior art cellular telephone, with integrated microphone and speaker positioned on a front surface together with a touch-screen display.
Figure 2:
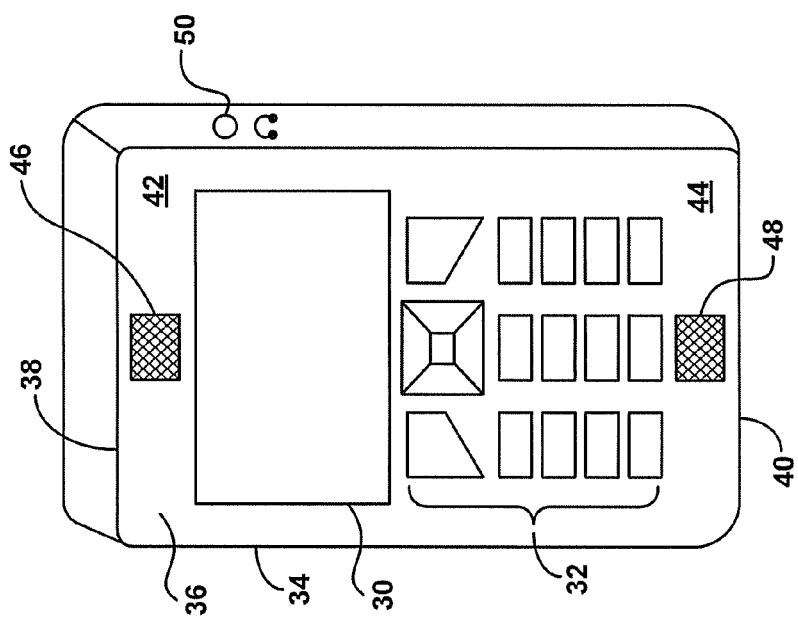
FIG. 2 is a perspective view of another prior art cellular telephone, with integrated microphone and speaker positioned on a front surface together with a display and a keypad.
Figure 3:
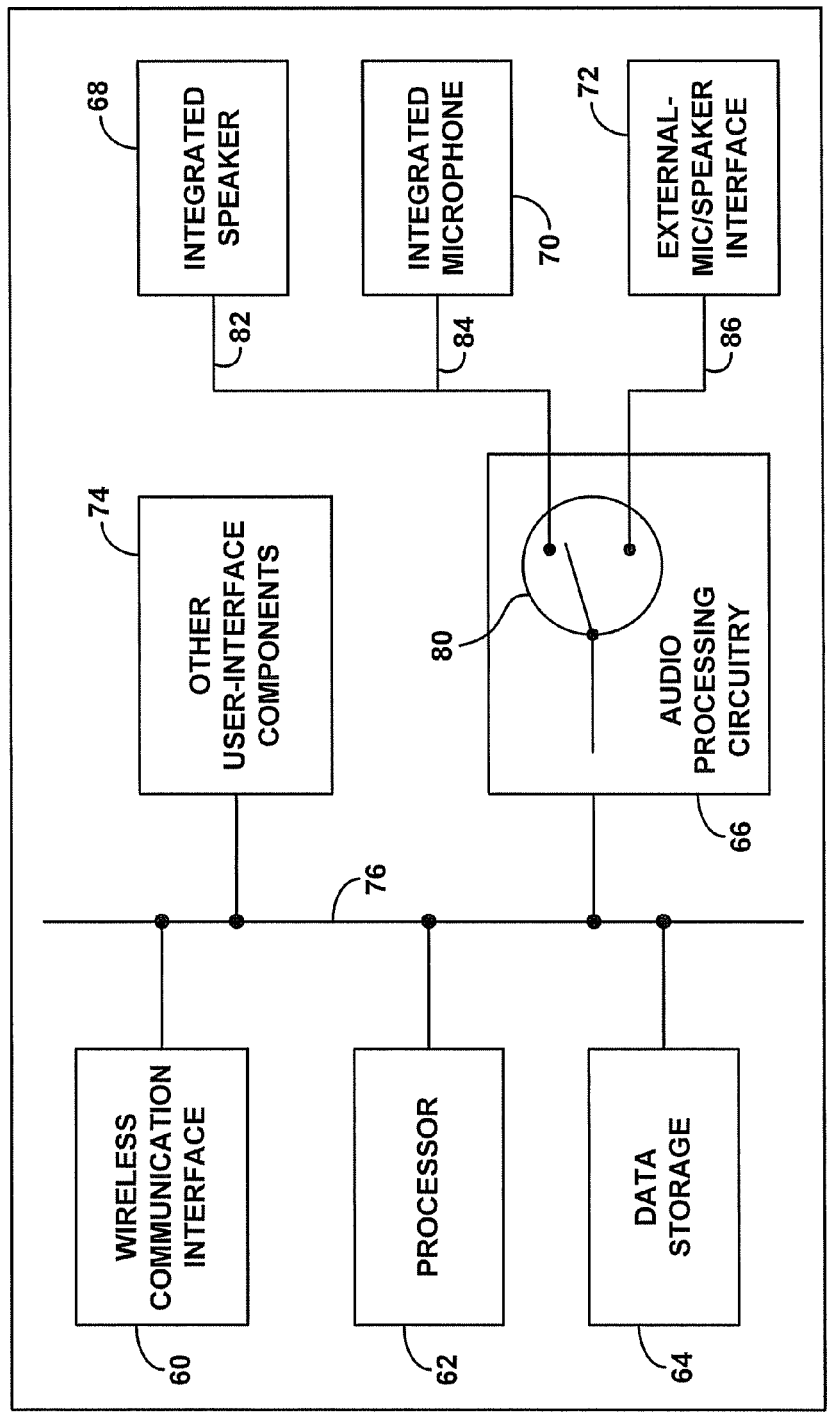
FIG. 3 is a simplified block diagram depicting components of a prior art cellular telephone.

Referring to the drawings, as noted above, FIGS. 1-3 depict prior art cellular telephone arrangements. FIGS. 1 and 2 are perspective views of prior art cellular telephones, showing the typical arrangement in which integrated microphone and integrated speaker are positioned on the front surface of the cellular telephone, thereby consuming valuable surface area. FIG. 3 is then a block diagram showing integrated or integral components of the prior art cellular telephone, i.e., components that cannot be removed or disconnected from the cellular telephone by a typical user.

The cellular telephone of FIG. 1 is an example touch-screen telephone having a telephone housing 12. As shown, a front surface 14 of the example telephone extends from a first edge 16 to a second edge 18 and includes a relatively large touch-screen display 20. The touch-screen display 20 of can be any type of touch-screen display now known or later developed and is generally arranged to display information, such a text and graphics, to a user and to receive input, such as text entry and graphical link and button actuation, from a user. Further the front surface 14 includes a power button 22 that can be actuated by a user to turn on the touch-screen display 20 so as to facilitate user interaction with the display.

In this prior art touch-screen telephone, an integrated speaker 24 is positioned at the front surface between the touch-screen display 20 and the first edge 16 of the telephone, and an integrated microphone 26 is positioned at the front surface between the touch-screen display 20 and the second edge 18 of the telephone. In particular, the integrated speaker 24 may be positioned internal to the telephone housing 12 in a fixed position just beneath one or more small holes in the front surface, such that when that portion of the cellular telephone is held to a user's ear, sound emitted by the speaker 24 could be heard by the user. Further, the integrated microphone 26 may be positioned internal to the telephone housing 12 in a fixed position just beneath one or more small holes in the front surface, such that when that portion of the cellular telephone is held near enough to the user's mouth, the microphone can pick up the user's voice.

With this arrangement, as discussed above, the existence of the integrated speaker and microphone on the front surface consumes some valuable surface area that could otherwise be used to provide a larger touch-screen display. Further, the cost to produce this cellular telephone includes an incremental cost to include the integrated speaker and microphone.

FIG. 1 further depicts on a side surface of the prior art cellular telephone (substantially normal to the top surface) a headset jack 28 arranged to receive a plug providing a connection with an optional external headset. When an external headset is connected to the cellular telephone via jack 28 and worn by a user, the user may engage in audible communication with the cellular telephone via the headset without the need to hold the cellular telephone with the integrated speaker and microphone near the user's ear and mouth. Alternatively or additionally, the cellular telephone may include a short-range wireless communication interface (not shown), such as a BLUETOOTH or WI-FI interface (or other frequency hopping spread spectrum connection mechanism) or an infrared interface, that provides connectivity with an optional wireless headset, similarly enabling a user to engage in audible communication with the cellular telephone without the need to hold the cellular telephone up to the user's ear and mouth.

The cellular telephone of FIG. 2 is next an example cellular §telephone equipped with a display 30 and keypad 32 and similarly having a telephone housing 34. As shown, a front surface 36 of this example telephone extends from a top edge 38 to a bottom edge 40, and the display 30 is positioned in a top portion 42 of the front surface and the keypad 32 is positioned in a bottom portion 44 of the front surface.

In this prior art telephone, an integrated speaker 46 is positioned at the front surface between the display 30 and the top edge 38 of the telephone, and an integrated microphone 48 is positioned at the front surface between the keypad 32 and the bottom edge of the telephone. As in the cellular telephone of FIG. 1, the integrated speaker 46 may be positioned internal to the telephone housing 34 in a fixed position just beneath one or more small holes in the front surface, such that when that portion of the cellular telephone is held to a user's ear, sound emitted by the speaker 46 could be heard by the user. Further, the integrated microphone 48 may be positioned internal to the telephone housing 34 in a fixed position just beneath one or more small holes in the front surface, such that when that portion of the cellular telephone is held near enough to the user's mouth, the microphone can pick up the user's voice.

With this arrangement again, as discussed above, the existence of the integrated speaker and microphone on the front surface consumes some valuable surface area that could otherwise be used to provide a larger display and/or a larger keypad. Further, the cost to produce this cellular telephone includes an incremental cost to include the integrated speaker and microphone.

As with the cellular telephone of FIG. 1, the cellular telephone of FIG. 2 is also shown including on a side surface a headset jack 50 arranged to receive a plug providing a connection with an optional external headset. When an external headset is connected to the cellular telephone via jack 50 and worn by a user, the user may thus engage in audible communication with the cellular telephone via the headset without the need to hold the cellular telephone with the integrated speaker and microphone near the user's ear and mouth. Alternatively or additionally, the cellular telephone may likewise include a short-range wireless communication interface (not shown) that provides connectivity with an optional wireless headset, similarly enabling a user to engage in audible communication with the cellular telephone without the need to hold the cellular telephone up to the user's ear and mouth.

FIG. 3 is next a simplified block diagram showing integral components of an example prior art cellular telephone. As shown in FIG. 3, the cellular telephone includes a wireless communication interface 60, a processor 62, data storage 64, audio processing circuitry 66, integrated speaker 68, integrated microphone 70, an external microphone/speaker interface 72, and other user interface components 74, which may be communicatively linked together by a system bus and/or one or more other connection mechanisms 76.

Wireless communication interface 60 functions to facilitate air interface communication with a serving cellular radio access network according to one or more protocols now known or later developed, such as CDMA (e.g., IS-95, IS-2000, 1xRTT, 1xEV-DO, etc.), WiMAX, iDEN, TDMA, AMPS, GSM, GPRS, UMTS, EDGE, LTE, for instance. As such, the wireless communication interface 60 preferably includes a transceiver compliant with the applicable protocol as well as one or more internal or external antennas.

Processor 62 comprises one or more general purpose processors (such as INTEL processors or the like) and/or one or more special purpose processors (such as digital signal processors or application specific integrated circuits), and may be combined with the wireless communication interface 60. If processor 62 includes more than one processor, the processors could work separately or in combination (e.g., in parallel). Data storage 64, in turn, comprises one or more volatile or non-volatile storage components, such as optical, magnetic, or organic storage, and may be integrated in whole or in part with processor 62. Data storage 64 preferably holds program instructions executable by processor 62 to carry out various cellular telephone functions, such as interfacing with and controlling the wireless communication interface 60, the audio processing circuitry 66, and the other user interface components 68.

Audio processing circuitry 66 may include analog-digital conversion circuitry and other components arranged to receive digital audio signals (from processor 62 and/or wireless communication interface 60 for instance), to convert the digital audio signals into analog audio signals for playout by a speaker to a user and to receive analog audio input via a microphone from a user and to convert the analog audio input into a digital audio signals for receipt by other components (again such as processor 62 and/or wireless communication interface 60). (Alternatively, the speaker and/or microphone may be arranged to process digital signals directly, thus possibly eliminating the need for a separate analog-digital conversion circuit.) In theory, audio processing circuitry can instead be provided through software rather than as hard circuitry. Therefore, the audio processing circuitry may more generally be considered an audio processor.

Integrated speaker 68 comprises a small speaker preferably positioned internal to the cellular telephone at a surface of the cellular telephone so that the speaker can be placed near a user's ear by holding that portion of the cellular telephone near the user's ear. Likewise, integrated microphone 70 comprises a small microphone preferably positioned internal to the cellular telephone at a surface of the cellular telephone so that the microphone can be placed within range of a user's mouth by holding that portion of the cellular telephone near enough to the user's mouth. In theory, the integrated speaker and integrated microphone could be combined into a single component of the cellular telephone.

External microphone/speaker interface 72 may comprise any mechanism for non-audible communication with an external microphone and external speaker, such as with an external headset that provides both microphone and speaker functionality. The non-audible communication between the cellular telephone and the external microphone and speaker may be wireless (e.g., BLUETOOTH, WI-FI, or infrared) or wireline (e.g., through an optical or copper wire cable connection) and thus carries audio communications in the form of non-audible audio signals representing the audio communications. For wireless headset communication, the external microphone/speaker interface 72 may comprise a short-range wireless transceiver, which may be configured through user interaction with the cellular telephone to pair with a wireless headset. For optical or other wired cable connection to a headset, the external microphone/speaker interface 72 may comprise an externally accessible jack into which a plug connected with the headset cable can be inserted. Numerous other arrangements for providing external microphone and external speaker connectivity may be possible as well.

As shown, the audio processing circuitry 66 includes a controllable switch 80 for connecting selectively with either (i) the integrated speaker 68 and integrated microphone 70 or (ii) the external microphone/speaker interface 72. A user may set the state of the audio switch 80 through interaction with a configuration menu of the cellular telephone (e.g., through keypad entry or touch-screen interaction), or through use of a physical switch (e.g., a slider switch or button) on the exterior surface of the cellular telephone.

When switch 80 is set to connect with the integrated microphone and integrated speaker, the switch 80 routes outbound audio communications from processor 62 or the like via path 82 to the integrated speaker 68 and receives and forwards inbound audio communications via path 84 from the integrated microphone 70. When switch is set to connect with the external microphone/speaker interface 72, on the other hand, the switch 80 routes outbound audio communications via path 86 to the external microphone/speaker interface 72 for transmission to an external headset or other externally connected speaker, and the switch 80 receives and forwards inbound audio communications via path 86 (perhaps a separate cable than that used for outbound audio communications) from an external headset or other externally connected microphone.

The other user interface components 74 may include other input and output components (not specifically shown). For instance, the user interface components 74 may include a display for presenting information visually to a user, a vibration mechanism for presenting tactile signals to a user, a touch-sensitive screen for receiving touch-entry by a user, a keypad with buttons for receiving non-screen keypad entry by a user, a video camera for receiving video entry, a power switch, a data port, and other components now known or later developed.

Figure 4:
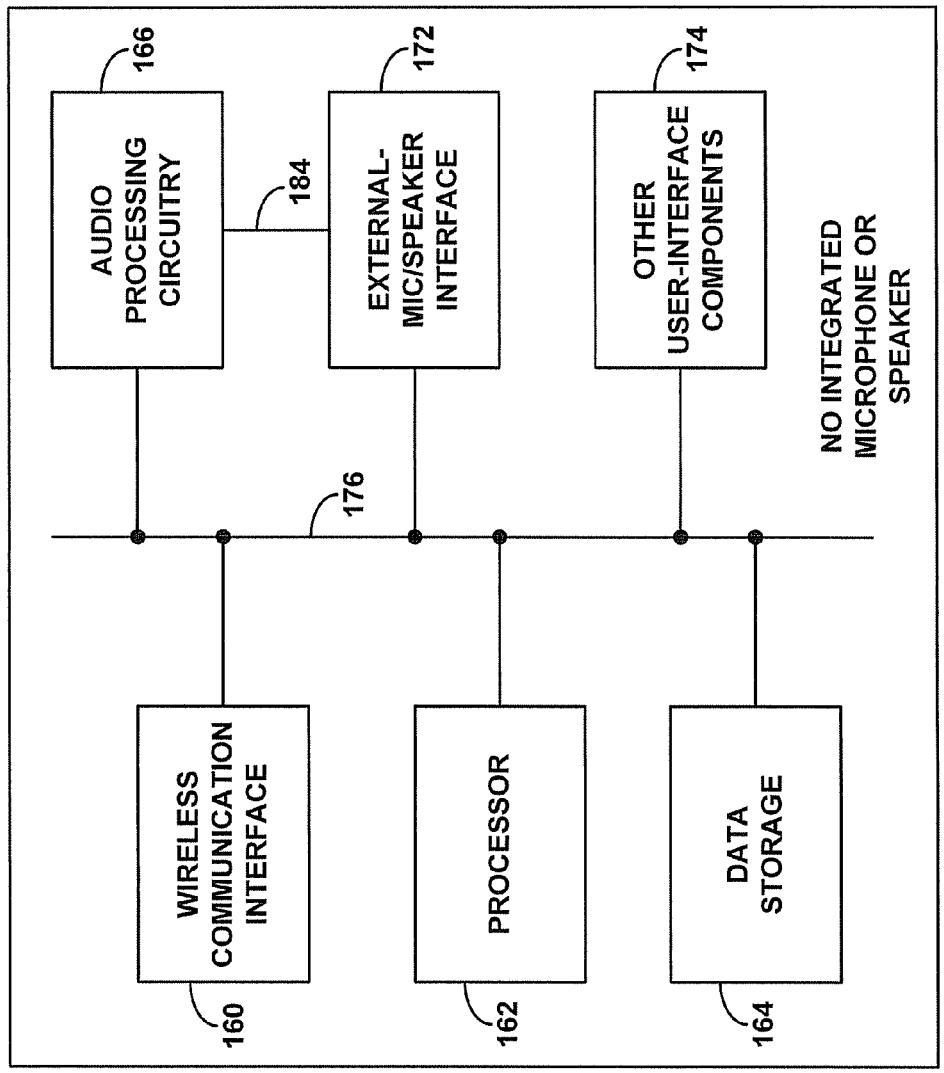
FIG. 4 is a simplified block diagram depicting components of a cellular telephone in accordance with the present disclosure, lacking an integrated microphone and speaker.

FIG. 4 is next a block diagram depicting components of an example of the cellular telephone presently contemplated. Importantly, the cellular telephone of FIG. 4 does not include an integrated microphone and does not include an integrated speaker, in any form or combination. Rather, the cellular telephone includes an external microphone/speaker interface for coupling with an external microphone and speaker, such as an external headset. To engage in bi-directional voice communication or other audible communication with this cellular telephone, a user must therefore use an externally connected microphone and speaker. By excluding an integrated microphone and integrated speaker from the cellular telephone, additional surface area may be available for other purposes, such as to accommodate a larger display and/or a larger keypad. Further, the cost to manufacture the cellular telephone may be incrementally lower, as the cost to include an integrated microphone and integrated speaker would be eliminated.

The arrangement of FIG. 4 parallels that of FIG. 3, except that it lacks the integrated speaker and integrated microphone and thus also lacks the audio switch for switching between use of integrated microphone/speaker and external microphone/speaker connections.

In particular, the cellular telephone of FIG. 4 includes a wireless communication interface 160, a processor 162, data storage 164, audio processing circuitry 166, an external microphone/speaker interface 172, and other user interface components 174, which may be communicatively linked together by a system bus and/or one or more other connection mechanisms 176.

Wireless communication interface 160 functions to facilitate air interface communication with a serving cellular radio access network according to one or more protocols now known or later developed, such as one of the protocols noted above for instance, and thus preferably includes a transceiver and one or more internal or external antennas. Processor 162 comprises one or more processors such as those noted above. And data storage 164 comprises one or more volatile or non-volatile storage components such as those noted above and may be integrated in whole or in part with processor 162. Data storage 164 preferably holds program instructions executable by processor 162 to carry out various cellular telephone functions, such as interfacing with and controlling the wireless communication interface 160, the audio processing circuitry 166, and the other user interface components 168.

Audio processing circuitry 166 may include analog-digital conversion circuitry and other components arranged to receive digital audio signals (from processor 162 and/or wireless communication interface 160 for instance), to convert the digital audio signals into analog audio signals for delivery to external microphone/speaker interface 172, and to receive analog audio input from external microphone/speaker interface 172 and to convert the analog audio input into a digital audio signals for receipt by other components (again such as processor 162 and/or wireless communication interface 160). (Alternatively, an externally connected speaker and/or microphone may be arranged to process digital signals directly, thus possibly eliminating the need for a separate analog-digital conversion circuit in the cellular telephone.)

External microphone/speaker interface 172 may comprise any mechanism for non-audible communication with an external microphone and external speaker, such as with an external headset that provides both microphone and speaker functionality, as discussed above. As noted above, the non-audible communication between the cellular telephone and the external microphone and speaker may be wireless (e.g., BLUETOOTH, WI-FI, or infrared) or wireline (e.g., through an optical or copper wire cable connection) and thus carries audio communications in the form of non-audible audio signals representing the audio communications. For wireless headset communication, the external microphone/speaker interface 172 may comprise a short-range wireless transceiver, which may be configured through user interaction with the cellular telephone to pair with a wireless headset. For optical or other wired cable connection to a headset, the external microphone/speaker interface 172 may comprise an externally accessible jack into which a plug connected with the headset cable can be inserted. Numerous other arrangements for providing external microphone and external speaker connectivity may be possible as well.

In practice, the audio processing circuitry 166 may communicate with the external microphone/speaker interface 172 via a path 184, which may comprise two circuit paths, one for outbound audio signals and one for inbound audio signals. Alternatively, the audio processing circuitry 166 may be integrally combined in some manner with the external microphone/speaker interface 172, thus avoiding the need to provide a circuit path between the two.

As above, the other user interface components 174 may include other input and output components (not specifically shown). For instance, the user interface components 174 may include a display for presenting information visually to a user, a vibration mechanism for presenting tactile signals to a user, a touch-sensitive screen for receiving touch-entry by a user, a keypad with buttons for receiving non-screen keypad entry by a user, a video camera for receiving video entry, a power switch, a data port, and other components now known or later developed.

Figure 5:
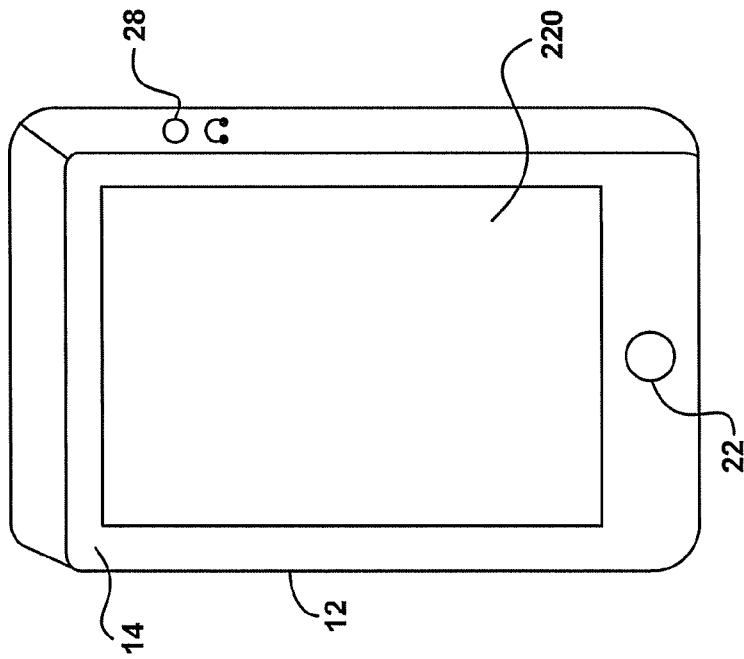
FIG. 5 is a perspective view of a cellular telephone in accordance with the present disclosure, lacking an integrated microphone and speaker and including an increased-sized touch-screen display.
Figure 6:
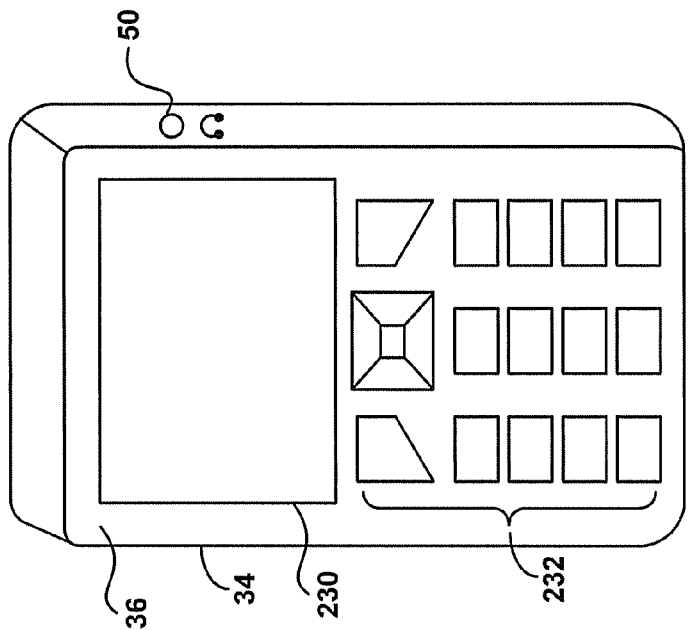
FIG. 6 is a perspective view of a cellular telephone in accordance with the present disclosure, lacking an integrated microphone and speaker and including an increased-sized display and/or increased sized keypad.

FIGS. 5 and 6 next depict exterior views of cellular telephones made in line with this disclosure, as variations from the cellular phone arrangements of FIGS. 1 and 2. Advantageously, the cellular telephones of FIGS. 5 and 6 lack any integrated microphone and integrated speaker, thus leaving more surface area for other device components, and thus likely reducing manufacturing cost.

FIG. 5 depicts a variation of the prior art touch-screen cellular telephone shown in FIG. 1, having the telephone housing 12. In the arrangement of FIG. 5, a touch-screen display 220 covers a larger surface area than the touch-screen display 20 shown in FIG. 1, albeit in a comparably sized telephone housing 12 with a comparably sized front surface 14. This larger touch-screen display is made possible by the exclusion of an integrated microphone and integrated speaker from the cellular telephone. Advantageously, the larger touch-screen display may make it easier for a user to interact with the display.

The cellular telephone of FIG. 5 may still include on a side surface the headset jack 28 arranged to receive a plug providing a connection with an external headset. Alternatively or additionally, the cellular telephone may include an integrated short-range wireless communication interface (not shown), such as a BLUETOOTH or WI-FI interface (or other frequency hopping spread spectrum connection mechanism) or an infrared interface for instance, that provides wireless connectivity with an external headset. In either case, a user of the cellular telephone would engage in audible communication with the cell phone through interaction with some form of an externally connected speaker and an externally connected microphone, because the cellular telephone lacks an integrated speaker and an integrated microphone.

FIG. 6 depicts a variation of the prior art cellular telephone shown in FIG. 2, having the telephone housing 34. In the arrangement of FIG. 6, a display 230 and/or keypad 232 cover a larger surface area than the display 30 and keypad 32 shown in FIG. 2, albeit in a comparably sized telephone housing 34 with a comparably sized front surface 36. This larger display and/or larger keypad is made possible by the exclusion of an integrated microphone and integrated speaker from the cellular telephone. Advantageously, the larger display and/or larger keypad may make it easier for a user to interact with the display and/or keypad.

The cellular telephone of FIG. 6 may still include on a side surface the headset jack 50 arranged to receive a plug providing a connection with an external headset. Alternatively or additionally, the cellular telephone may include an integrated short-range wireless communication interface (not shown), such as a BLUETOOTH or WI-FI interface (or other frequency hopping spread spectrum connection mechanism) or an infrared interface for instance, that provides wireless connectivity with an external headset. In either case, a user of the cellular telephone would engage in audible communication with the cell phone through interaction with some form of an externally connected speaker and an externally connected microphone, because the cellular telephone lacks an integrated speaker and an integrated microphone.

When selling a cellular phone that lacks an integrated speaker and integrated microphone, a vendor may sell the cellular telephone in a kit together with headset, such as a wireless headset optimally pre-paired with the cellular telephone, or a wired headset. Alternatively, a user may acquire a headset or other externally connectable speaker/microphone mechanism separately and couple it with the cellular telephone.

The voice communications (e.g., voice calls) in which a user engages via the cell phone may proceed via the cellular wireless communication interface of the cellular telephone and via the serving radio access network and a circuit-switched transport network (such as the public switched telephone network) and may not involve voice over Internet Protocol (VoIP) communications with the cellular telephone (e.g., the cellular telephone engaging in VoIP communication). Alternatively, the voice communications may involve the cellular telephone engaging in VoIP communication.

An exemplary embodiment has been described above. Those skilled in the art will understand, however, that changes and modifications may be made to this embodiment without departing from the true scope and spirit of the claims.

What is claimed is:
1. A cellular telephone comprising:
a cellular telephone housing;
a cellular wireless communication interface for engaging in voice calls via an air interface connection with a serving cellular radio access network;
a display for presenting information to a user; and
an audio interface for communicating with an external speaker and external microphone so as to send outbound audio communications from the cellular telephone to the external speaker for audible presentation to a user and to receive inbound audio communications from the external microphone;
wherein the cellular telephone does not include an integrated speaker for audible presentation to a user and does not include an integrated microphone for receiving audio communications from a user.

2. The cellular telephone of claim 1, further comprising:
an audio processor for processing the inbound audio communications and the outbound audio communications.

3. The cellular telephone of claim 1, wherein the audio processor is integrated with the audio interface.

4. The cellular telephone of claim 1, wherein the audio interface comprises a short-range wireless connection mechanism.

5. The cellular telephone of claim 4, wherein the short-range wireless connection mechanism comprises a frequency hopping spread spectrum connection mechanism.

6. The cellular telephone of claim 4, wherein the short-range wireless connection mechanism comprises an infrared connection mechanism.

7. The cellular telephone of claim 2, wherein the external speaker and external microphone are provided together in a headset.

8. The cellular telephone of claim 1, wherein the audio interface connects via a wired connection mechanism with the external speaker and external microphone.

9. The cellular telephone of claim 1, wherein the audio interface connects via an optical connection mechanism with the external speaker and external microphone.

10. The cellular telephone of claim 1, wherein the display comprises a touch-sensitive display.

11. The cellular telephone of claim 1, further comprising a keypad for receiving keypad entry from a user.

12. The cellular telephone of claim 1, wherein the cellular wireless communication interface, the display, and the audio interface are integral components of the cellular telephone.

13. The cellular telephone of claim 1, wherein the voice calls do not involve the cellular telephone engaging in voice over Internet Protocol communication.

14. A cellular telephone comprising:
a cellular telephone housing;
a cellular wireless communication interface for engaging in voice calls via an air interface connection with a serving cellular radio access network;
a touch-sensitive display for presenting information to a user;
an short-range wireless audio interface for communicating with an external headset so as to wirelessly transmit outbound audio communications from the cellular telephone for audible presentation by a speaker of the external headset and to wirelessly receive inbound audio communications provided via a microphone of the external headset; and
an audio processor for processing the inbound audio communications and the outbound audio communications,
wherein the cellular telephone does not include an integrated speaker for audible presentation to a user and does not include an integrated microphone for receiving audio communications from a user.

15. The cellular telephone of claim 14, wherein the voice calls do not involve the cellular telephone engaging in voice over Internet Protocol communication.

16. A cellular telephone having a top surface extending from a first edge to a second edge and having a touch-screen display disposed on the top surface between the first edge and the second edge,
the cellular telephone further including a short-range wireless interface for communicating with an external headset to be worn by a user of the cellular telephone,
wherein the short-range wireless interface wirelessly receives from the external headset inbound voice communications that the user provides into a microphone of the external headset,
wherein the short-range wireless interface wirelessly transmits outbound voice communications to the external headset, for a speaker of the external headset to audibly present to the user, and
wherein the cellular telephone does not include an integrated speaker for audible presentation to a user and does not include an integrated microphone for receiving audio communications from a user.

17. The cellular telephone of claim 16, further comprising a jack for receiving a cable connection for external wired headset, wherein the jack is disposed on a side of the cellular telephone, the side extending substantially normally to the top surface.

18. The cellular telephone of claim 16, further comprising a non-screen keypad for receiving user entry.

19. The cellular telephone of claim 16, being a handheld device having length, width and height dimensions totaling to no greater than nine inches.

20. The cellular telephone of claim 16, wherein the voice communications proceed via a cellular wireless communication interface of the cellular telephone and via a circuit-switched network and do not involve voice over Internet Protocol communication with the cellular telephone.

* * * * *